United States Patent Office 3,657,142
Patented Apr. 18, 1972

3,657,142
ZINC SULFIDE PHOSPHORS
Stanley M. Poss, 302 Wilmot Drive,
Towanda, Pa. 18848
No Drawing. Continuation of application Ser. No. 812,925, Apr. 2, 1969. This application Apr. 19, 1971, Ser. No. 135,414
Int. Cl. C09k 1/12
U.S. Cl. 252—301.6 S
7 Claims

ABSTRACT OF THE DISCLOSURE

Zinc sulfide phosphors are disclosed that consist essentially of a major amount of zinc sulfide as the host, from about 0.001% to about 0.05% by weight of copper and as a co-activator an amount of metal selected from the group consisting of from about 0.01% to about 0.09% by weight of silver and from about 0.004% to about 0.009% by weight of bismuth. A process for producing said phosphors is disclosed that comprises forming a blend of zinc sulfide, copper salts and the foregoing other metal salts, heat treating under controlled temperature and atmospheric conditions and cooling under controlled atmospheric conditions.

CROSS-REFERENCE TO RELATED APPLICATION

This is a continuation of application Ser. No. 812,925, filed Apr. 2, 1969, now abandoned.

BACKGROUND OF THE INVENTION

This invention relates to improved zinc sulfide phosphor composition. More particularly it relates to photoluminescent zinc sulfide phosphors having improved properties.

Zinc sulfide phosphors have generally been used in cathode ray tubes or as color emitters in lighting devices. Regardless of the type of device in which these phosphors have been heretofore used, a short persistence or decay time is desired. More specifically, it is desired to have a phosphor composition that will stop emitting light essentially as soon as the medium that is used to excite the phosphor is discontinued.

Recently there has developed some new uses for phosphorescent materials. It is highly desirable to coat certain materials with phosphor compositions or incorporate these compositions into the materials, then subject such treated materials to light, such as daylight, fluorescent or incandescent light, then upon removing the light source the material continues to emit visible light. A long decay time or persistence is highly desirable. As can be appreciated, a phosphor having a decay time of the magnitude of that in cathode ray tubes (usually milliseconds) would render the phosphor essentially useless for these later developed uses. Additionally, the brighter or more intense the visible light, the more desirable the phosphor.

It is believed, therefore, that a phosphor composition that will emit an appreciable amount of visible light for extended periods of time after cessation of the excitation source and that is considerably brighter than the phosphor heretofore known, would be an advancement in the art.

SUMMARY OF THE INVENTION

In accordance with one aspect of this invention there is provided a phosphor composition consisting essentially of a major amount of zinc sulfide as the host material and, relatively minor amounts as a co-activator, copper and a second activator selected from the group consisting of silver and bismuth, the co-activators being present in the amounts hereafter specified.

In accordance with another aspect of this invention, there is provided a process for producing said phosphor composition comprising forming a uniform finely divided mixture of zinc sulfide, a copper salt of acid selected from mineral acids and lower aliphatic acids and a silver or bismuth salt of the foregoing acids, heat treating said mixture under non-oxidizing conditions and at a temperature of from about 1000° C. to about 1300° C. for a time sufficient to decompose said salts and to achieve diffusion of the decomposition products of the co-activators throughout the zinc sulfide host and thereafter cooling the heated mixture to atmospheric temperature under non-oxidizing conditions.

DESCRIPTION OF THE PREFERRED EMBODIMENTS

Copper-silver activated zinc sulfide

Only relatively minute amounts of each activator are included in the phosphor composition. Usually a few hundredths of one percent by weight of copper, or less, and a few hundredths of one percent by weight of silver is sufficient. The percentages are based on the weight of the zinc sulfide. For practical reasons it is more convenient and more accurate to express the minute amounts of the two activators included in the finished phosphor in terms of the amounts admixed with the raw zinc sulfide prior to heat treatment, since under some conditions some of the activators can be lost during heat treating. Expressed in weight percent based on the total weight of zinc sulfide in the mixture prepared for heat treatment, the useful and preferred ranges of the two activators are as follows:

TABLE I

|  | Preferred range | Useful range |
|---|---|---|
| Copper (calculated as Cu) | .009–.030 | .001–.050 |
| Silver (calculated as Ag) | .03–.07 | .01–.09 |

In straight copper activated phosphors, phosphorescence is at a maximum when the copper concentration is close to .011%. When silver is included with copper, phosphorescence is at a maximum throughout the period of one minute to one hour after excitation with silver in the range of .03 to .07% and copper in the range of .009 to .03%. Thus, in these phosphors the weight of silver is about ten times the weight of copper. The wider useful ranges of copper and silver herein before recited, yield phosphors superior to the best straight copper-activated phosphor.

The composition of a typical raw material used to produce the phosphor of this invention are given below. The various constituents being expressed in terms of the amount included in the crude mixture prepared for heat treatment.

TABLE II

| | Parts by weight |
|---|---|
| Zinc sulfide | 2724 |
| Sodium chloride | 56 |
| Copper sulfate | .83 |
| Silver nitrate | 1.8 |

The following table compares the phosphorescent brightness in relative photomultiplier output of series of phosphor of the invention (A) with similar straight copper-activated phosphors (B) activated with .053% silver and indicates the superior brightness (percent improvement) of the former.

TABLE III

| Time | A | B | Percent improvement |
| --- | --- | --- | --- |
| 0 minute | 100 | 165 | 65 |
| 1 minute | 19 | 42 | 120 |
| 15 minutes | .7 | 2.0 | 186 |
| 30 minutes | .25 | .75 | 200 |
| 60 minutes | 0 | .15 | 150 |

It will be seen from the foregoing table that the presence of both copper and silver as activators is superior to copper as a single activator. It will be also noted that the improvement in phosphorescence brightness of the foregoing phosphor of the invention is generally of the order of 100–200% during the period of one minute to sixty minutes after excitation. This is particularly advantageous because it means that the phosphors of the invention retain better luminosity over an hour period than do prior art phosphor. Inasmuch as the uses to which phosphorescent phosphors are customarily put, involves excitation during hours of daylight and luminosity is desired in the following hours of darkness. The effective retention of luminosity by the phosphors of the invention is particularly advantageous.

The ICI color coordinates for the foregoing phosphor are $$x=0.251$$

$$x=0.555$$

Copper-bismuth activated zinc sulfide

As in the copper-silver activated sulfide phosphors only relatively minute amounts of each activator are included in the phosphor. Usually a few hundredths of one percent by weight of copper and a few hundredths of one percent by weight of bismuth are sufficient. The percentages by weight are based on the weight of the zinc sulfide. As heretofore mentioned for practical reasons, it is more convenient and more accurate to express the minute amounts of the two activators included in the finished phosphor in terms of the amounts admixed with the raw zinc sulfide prior to heat treatment. Expressed in weight percent based on the total weight of zinc sulfide in the mixture prepared for heat treatment, the useful and preferred ranges of the two activators are as follows:

|  | Preferred range, percent | Useful range, percent |
| --- | --- | --- |
| Copper (calculated as Cu) | .009–.030 | .001–.05 |
| Bismuth (calculated as Bi) | .005–.007 | .004–.009 |

In straight Cu–Ag activated phosphors, phosphorescence is at a maximum when the copper concentration is close to .011%, and the silver concentration is close to .05%. When bismuth is included with copper, phosphorescence is at a maximum throughout the period of one minute to one hour after excitation with bismuth in the range of .005 to .007% and copper in the range of .009 to .03%. Thus, in these phosphors the weight of bismuth is about half the weight of copper. The wider, useful ranges of copper and bismuth herein being recited, yield phosphor superior to the best straight Cu–Ag activated phosphor.

The composition of a typical mixture used to prepare the phosphor of this invention is given below. The various constituents being expressed in terms of the amount included in the crude mixture prepared for heat treatment.

| | Parts by weight |
| --- | --- |
| Zinc sulfide | 2724 |
| Sodium chloride | 56 |
| Copper sulfate | .83 |
| Bismuth tetraoxide | .47 |

The following table compares the phosphorescent brightness in relatively photomultiplier output of a series of phosphor of the invention. (A) with copper-silver activated phosphors previously disclosed herein, (B) activated with bismuth and copper and indicates the superior brightness (percent improvement) of the latter over even the copper-silver activated phosphor that was from 100 to 200% brighter than the copper activated phosphor.

| Time | A | B | Percent improvement |
| --- | --- | --- | --- |
| 0 minute | 100 | 107 | 7 |
| 1 minute | 100 | 107 | 7 |
| 15 minutes | 100 | 105 | 5 |
| 30 minutes | 100 | 104 | 4 |
| 60 minutes | 100 | 103 | 3 |

It will be seen from the foregoing table that the presence of both copper and bismuth as activators is superior to the copper-silver double activator. It will also be noted that the improvement in the phosphorescent brightness of the foregoing phosphor of the invention is generally of the order of 3 to 10% during the period of one minute to 60 minutes after excitation. This is particularly advantageous because it means that the phosphors of the invention retain better luminosity over an hour period than do prior art phosphors. The use of phosphorescent phosphors involves excitation during hours of daylight and luminosity is desired in the following hours of darkness. The effective retention of luminosity by the phosphors of this invention is particularly advantageous.

Process for preparing the co-activated zinc sulfide phosphors

The activation of zinc sulfide is commonly affected by muffling or otherwise suitably heat treating at elevated temperatures a mixture of the sulfide and a minute amount of the activators in the form of a salt such as appropriate nitrates. While it is customary to refer to the activator in the resulting phosphorescent phosphor as copper or one of the other metals, it will be understood that the copper or the other metal is not present in the elemental form, rather as a compound of copper and the metal that results from the decomposition of the salt at elevated temperatures.

The phosphors of this invention are made by heat treating at elevated temperature, a mixture comprising the zinc sulfide and containing as activators minute amounts of both a copper and another metal. In addition to the activator small amounts of fluxes such as, for example, as one or more alkali metal salts can be included in the mixture. The heat treatment is carried out in a non-oxidizing and preferably inert or slightly reducing atmosphere and may be advantageously conducted in a retort or muffle externally heated to impart a temperature of 900° C.–1300° C. to the mixture. At the lower end of this temperature range, a relatively long treating period is required. And conversely at the upper end of the temperature range the heating period must be relatively short and is carried out with care to prevent damage to the phosphor. In general, muffling temperatures within the range of 1200°–1300° C. give particularly effective results. The heat treatment is continued for 1 to 3 hours, which is generally sufficient to affect the diffusion of the activators throughout the zinc sulfide.

In general, the salts that can be used are the metal salts of mineral acids such as the nitrates, carbonates, chlorides and the like. Additionally metal salts of the lower aliphatic acids can be used such as the acetates, formates, oxalates and the like. Selection of the salts will be generally made upon their availability, however, in general, any salt that will decompose within the range of 900° C. to 1300° C. can be used.

Because of the difficulty of uniformly distributing the minute amounts of metal salts throughout the zinc sulfide, these salts are advantageously mixed with the zinc sulfide by grinding.

The inclusion of fluxes in the mixture before heat treating is helpful in introducing the activators into the phosphor crystals during the heat treatment. Various fluxes can be used without materially altering the improvement obtainable from the co-activated phosphors. Among suitable fluxes for this purpose are alkali metal salts, such as for example, sodium chloride, sodium carbonate, lithium sulfate. Moreover, any flux combination which is suitable for copper activated phosphors is suitable for co-activated phosphors of this invention. Generally fluxes are used in amounts of from about 1% to about 4% by weight of the mixture.

While there have been shown and described what are at present considered the preferred embodiments of this invention, it will be obvious to those skilled in the art that various changes may be made therein without departing from the scope of the invention as defined by the appended claims.

What is claimed is:

1. A photoluminescent phosphor composition consisting essentially of zinc sulfide as the host material, from about 0.001% to about 0.05% by weight of copper and as a co-activator an amount of metal selected from group consisting of from about 0.01% to about 0.09% by weight of silver and from about 0.004% to about 0.009% by weight of bismuth.

2. A phosphor composition according to claim 1 wherein said co-activator is silver.

3. A phosphor composition according to claim 2 wherein said copper is present in amounts of from 0.009 to about 0.03% by weight and said silver is present in amounts of from about 0.03% to about 0.07% by weight.

4. A phosphor composition according to claim 1 wherein said co-activator is bismuth.

5. A phosphor composition according to claim 4 wherein said copper is present in amounts of from about 0.009% to about 0.03% by weight and said bismuth is present in amounts of from about 0.005% to about 0.007% by weight.

6. A process for producing a photoluminescent co-activated zinc sulfide phosphor composition comprising:
   (a) forming a uniform blend of zinc sulfide and from about 0.001% to about 0.05% by weight of copper in the form of a salt of a mineral acid or a lower aliphatic acid and an amount of a second metal salt of said acid selected from the group consisting of from about 0.01% to about 0.09% by weight of silver and from about 0.004% to about 0.009% by weight of bismuth, said amounts calculated on the basis of the metal present and on the basis of said zinc sulfide,
   (b) heat treating under non-oxidizing conditions said uniform blend at a temperature of from about 900° C. to about 1300° C. for a time sufficient to decompose said metal salts and to achieve diffusion of said activators throughout said zinc sulfide to thereby form said phosphor composition, and
   (c) cooling the said phosphor composition to atmospheric temperature under non-oxidizing conditions.

7. A method according to claim 6 wherein from about 1 to about 4% by weight of an alkali metal salt flux is present in said blend.

References Cited
UNITED STATES PATENTS

| | | | |
|---|---|---|---|
| 2,951,813 | 9/1960 | Wachtel | 252—301.6 S |
| 2,987,485 | 6/1961 | Froelich | 252—301.6 S |
| 3,034,990 | 5/1962 | Waxrymen | 252—301.6 S |

TOBIAS E. LEVOW, Primary Examiner

J. COOPER, Assistant Examiner

PO-1050
(5/69)

UNITED STATES PATENT OFFICE
CERTIFICATE OF CORRECTION

Patent No. 3,657,142  Dated  April 18, 1972

Inventor(s)  Stanley M. Poss

It is certified that error appears in the above-identified patent and that said Letters Patent are hereby corrected as shown below:

Column 1, please add the following after the inventor's name:

"Assignor to GTE Sylvania Incorporated, a Delaware corporation"

Signed and sealed this 3rd day of October 1972.

(SEAL)
Attest:

EDWARD M. FLETCHER, JR.
Attesting Officer

ROBERT GOTTSCHALK
Commissioner of Patents